INVENTORS.
CARL H. NYSTROM
ARTHUR T. HUSE
BY
ATTORNEY.

INVENTORS.
CARL H. NYSTROM
BY ARTHUR T. HUSE

ATTORNEY.

Aug. 23, 1960
C. H. NYSTROM ET AL
2,950,095
FUEL INJECTION APPARATUS
Filed March 29, 1955
6 Sheets-Sheet 3
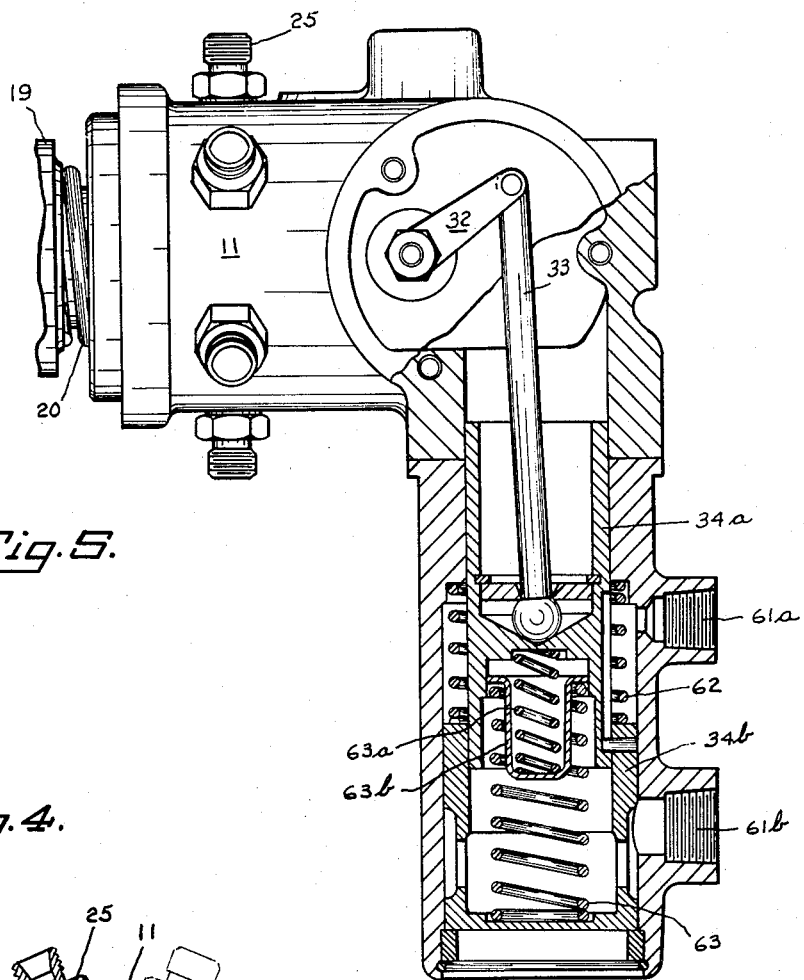
Fig. 5.
Fig. 4.
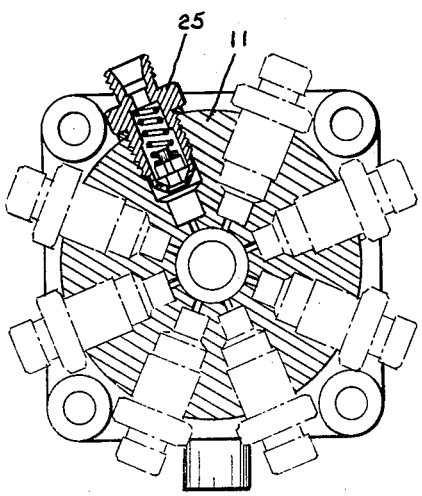
INVENTORS.
CARL H. NYSTROM
BY ARTHUR T. HUSE
*Raymond A. Paquin*
ATTORNEY.

Aug. 23, 1960
C. H. NYSTROM ET AL
2,950,095
FUEL INJECTION APPARATUS
Filed March 29, 1955
6 Sheets-Sheet 4
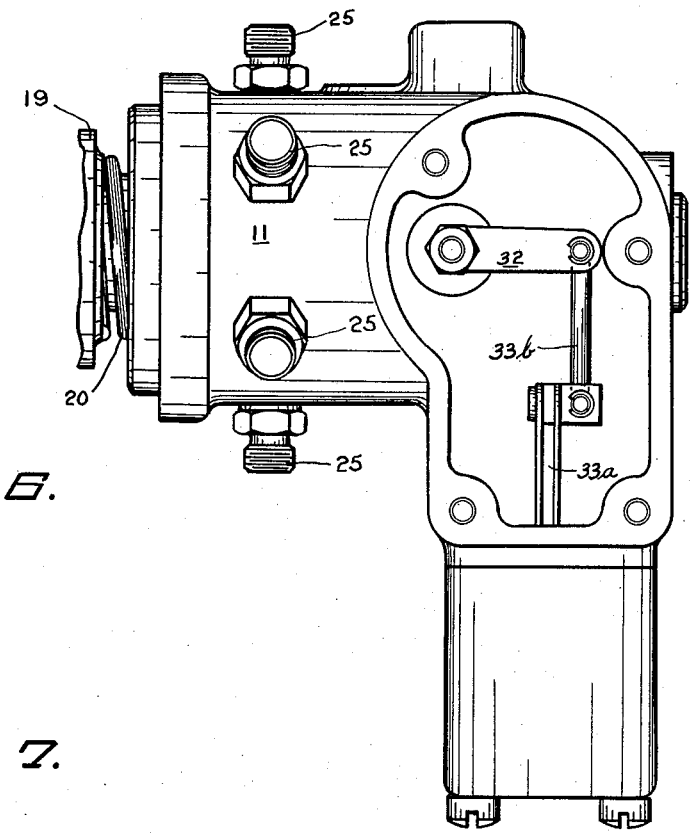
Fig. 6.
Fig. 7.
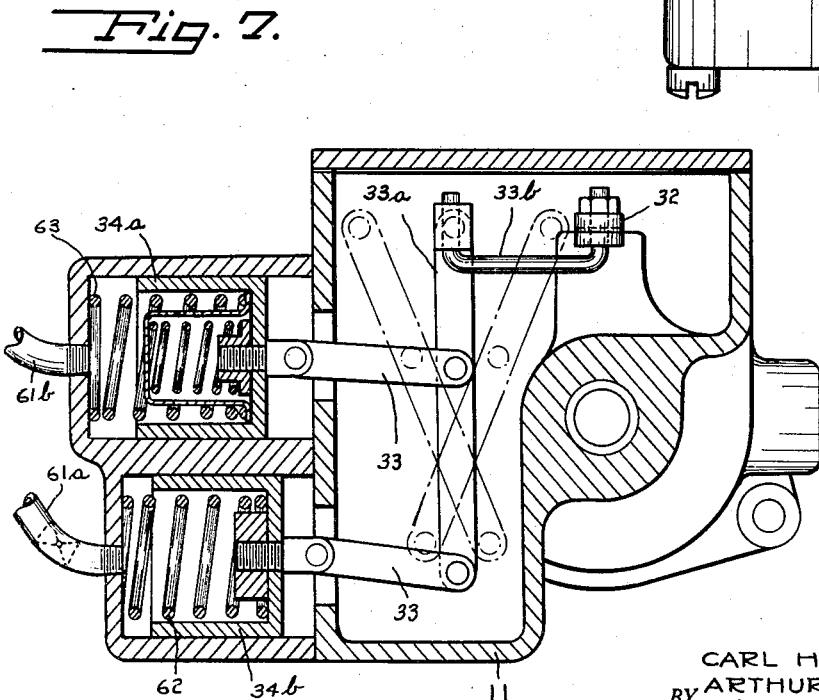
INVENTORS.
CARL H. NYSTROM
BY ARTHUR T. HUSE
Raymond A. Paquin
ATTORNEY.

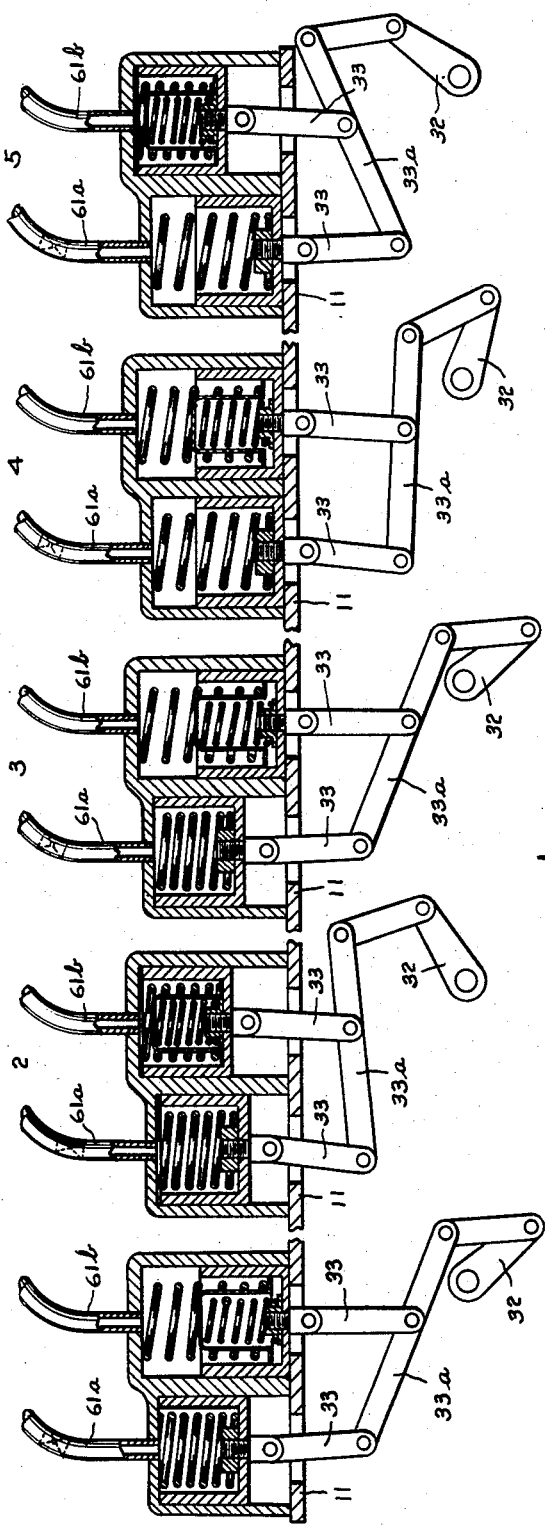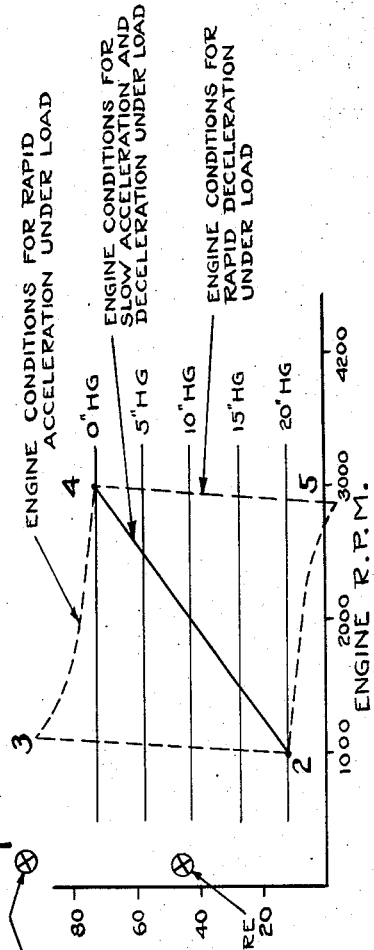

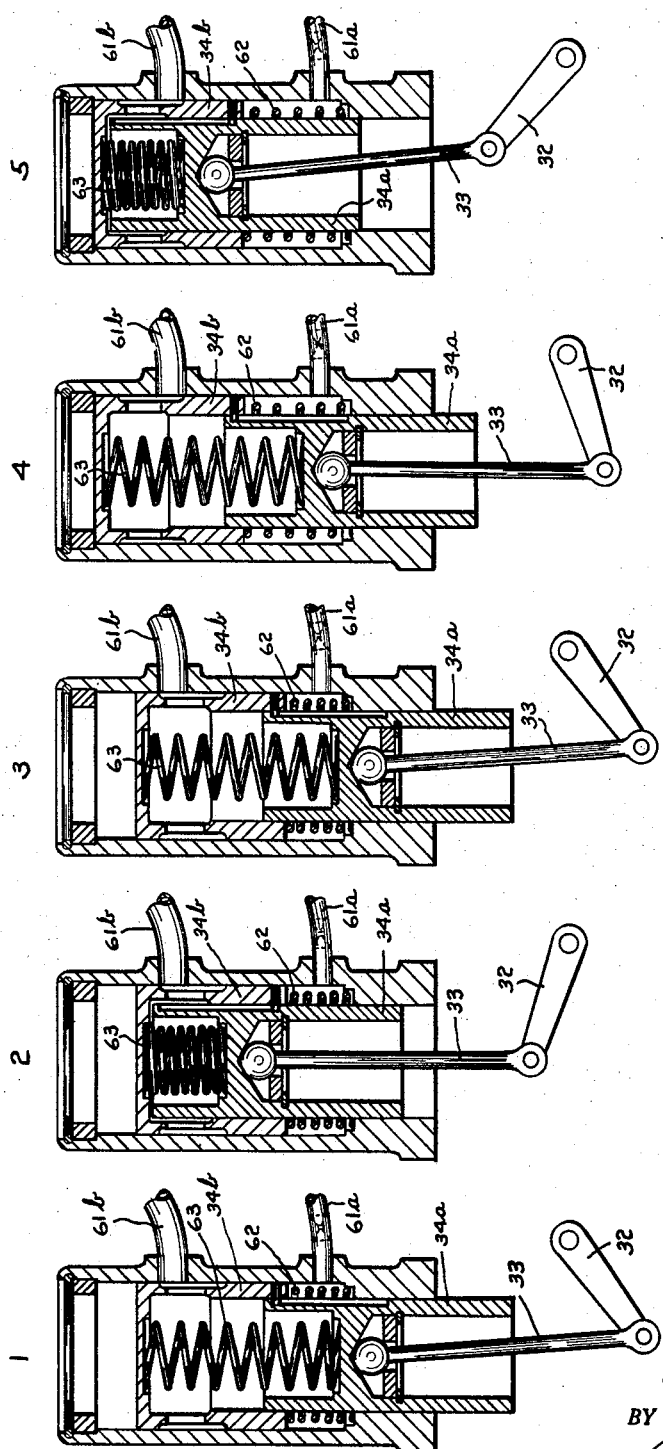

United States Patent Office 2,950,095
Patented Aug. 23, 1960

2,950,095

FUEL INJECTION APPARATUS

Carl H. Nystrom, West Springfield, and Arthur T. Huse, Springfield, Mass., assignors to American Bosch Arma Corporation, a corporation of New York Filed Mar. 29, 1955, Ser. No. 497,506

5 Claims. (Cl. 261—26)

This invention relates to fuel injection apparatus and has particular reference to a new and improved fuel injection apparatus which is particularly intended for use on spark ignition engines.

An object of the invention is to provide a new and improved fuel injection unit which unit comprises the fuel pump and control and can be calibrated on the test stand as a unit and then installed on the engine as a calibrated unit.

Another object is to provide a new and improved fuel injection apparatus of the type set forth which may be mounted in any of various positions on the engine without the necessity of additional linkage or other connecting parts.

Another object is to provide a new and improved fuel injection apparatus which provides the engine with a more rapid accelerating response and with less delay.

Another object is to provide a fuel injection unit of the type set forth wherein the pump and control are provided in a completely sealed unitary construction without danger of dirt and foreign particles entering the unit and interfering with the operation of working parts.

Another object is to provide a fuel injection unit of the type set forth wherein the sealing of the control shaft is simplified and vented to the engine manifold whereby any leakage of fuel is drawn into the engine manifold.

Another object of the invention is to provide a fuel injection apparatus having new and improved means for providing additional fuel for starting and acceleration purposes.

Other objects and advantages of the invention will be apparent from the following description taken in connection with the accompanying drawings. It will be understood that changes may be made in the details of construction and arrangement of parts without departing from the scope of the invention as set forth in the accompanying claims, as the preferred forms of the invention have been given by way of illustration only.

Referring to the drawings:

Fig. 4 is a sectional view taken on line 4—4 of Fig. 3, looking in the direction of the arrows;

Fig. 5 is a view generally similar to Fig. 2, but showing a modified form of the control;

Fig. 6 is a view generally similar to Figs. 2 and 5, but showing a modified arrangement for connecting the pump and control;

Fig. 7 is a sectional view through a modified form of the control;

Fig. 8 is a composite diagrammatic view illustrating the operation of the form of control shown in Fig. 7;

Fig. 9 is a view generally similar to Fig. 8, but illustrating the operation of the form of control shown in Fig. 5; and Fig. 10 is a chart illustrating the operation of the form of invention shown in Fig. 8.

Figure 1:
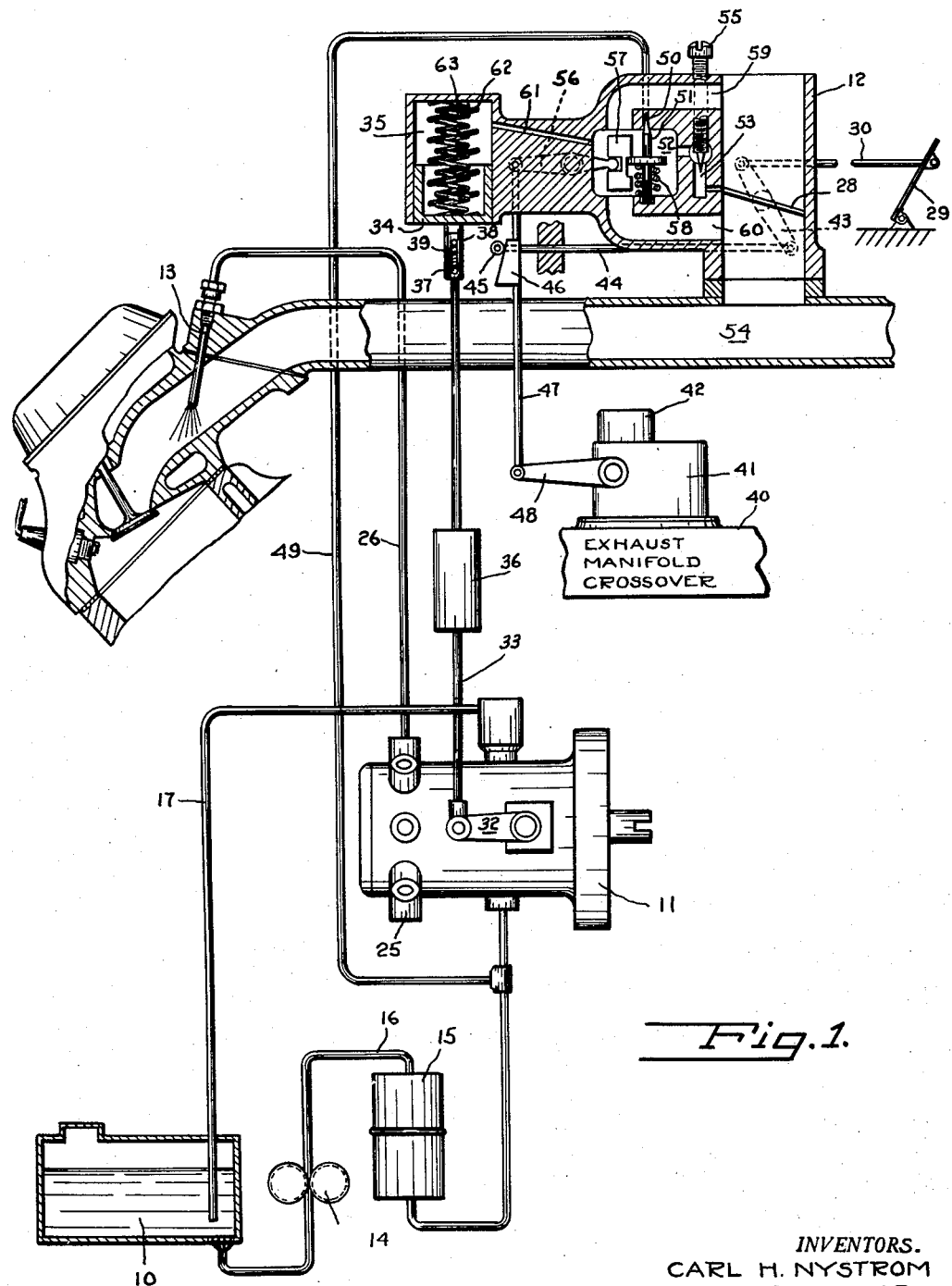
Fig. 1 is a schematic view of a fuel injection system for spark ignition engines.

Referring more particularly to the drawings wherein similar reference characters designate corresponding parts throughout, the fuel injection system shown in Fig. 1 includes the fuel supply tank 10, injection pump 11, throttle body 12 and injection nozzles 13.

Between the supply tank 10 and injection pump 11 is provided the supply pump 14 which may be of the gear type or other constant displacement types such as a vane or diaphragm type pump adapted to supply fuel from the tank 10 to the injection pump 11 at relatively low supply pressure, for example, 25 p.s.i. Between the supply pump 14 and injection pump 11 is provided the filter 15 for filtering the fuel passing through the line 16.

The fuel injection pump 11 is of the distributor type and, preferably, a high pressure metering type of pump with the return line 17 connecting the pump 11 and supply tank 10 for the return to the tank of fuel supplied or bypassed by the pump.

Figure 3:
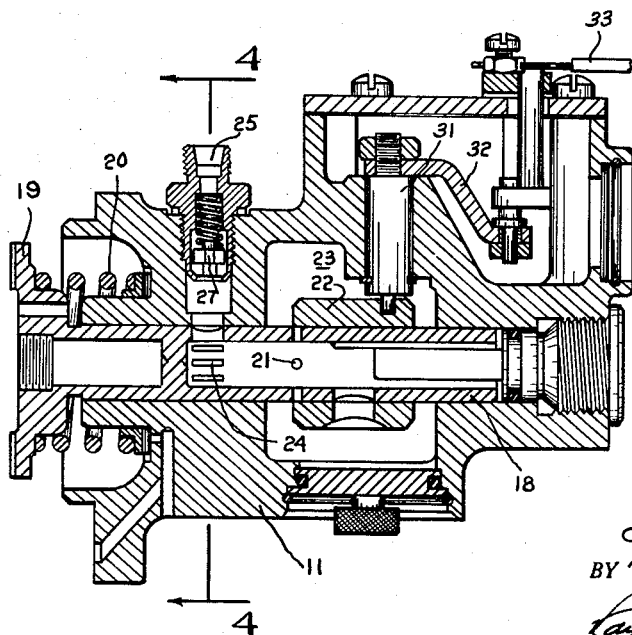
Fig. 3 is a longitudinal sectional view of the fuel injection pump of the present invention.

The injection pump 11 is shown in section in Fig. 3 and includes the rotating and reciprocating pumping and distributing member 18 which is adapted to be operatively connected to a rotary member on the engine and to be driven thereby and said member 18 is provided with the face cam 19 for effecting reciprocation of the member 18 upon the rotation thereof.

The spring 20 is provided for effecting the return stroke of the member 18 and also for retaining the face cam 19 in engagement with the operating member on the engine.

The pumping and distributing member 18 is provided with a bore communicating with the spill port 21 over which is positioned the adjustable sleeve 22 for controlling the spilling or bypassing of fuel into the bypass sump 23 from which the fuel which is spilled or bypassed returns through return line 17 to fuel supply tank 10.

The pumping and distributing member 18 is provided with the delivery port 24 adapted to communicate with each of the outlets 25 successively upon rotation of member 18 whereupon fuel is deliver through outlets 25 and delivery lines 26 connecting each of said outlets to its respective nozzle 13. In each of the outlets 25 is positioned a delivery or check valve 27.

The throttle body 12 includes the air throttle 28 which is connected to the foot throttle 29 by means of link 30 whereby said air throttle may be adjusted during the operation of the engine.

The fuel quantity or by pass control sleeve 22 is connected to the eccentric or shaft 31 which is connected through lever 32 to fuel control linkage 33 and link 33 is connected to the manifold pressure piston 34 in cylinder 35.

On fuel control link 33 is provided the acceleration weight or mass 36 and adjacent the end of linkage 33 is provided a pin 37 in slot 38. The weight 36, together with the slot 38 and pin 37 and spring 39 allows the quantity control lever 32 of the injection pump to be moved to a position beyond normal full load whereby additional fuel is provided for starting the engine as set forth in application Serial No. 462,183, filed October 14, 1954, now Patent No. 2,794,432.

On the exhaust manifold crossover 40 is provided the thermostatic or bi-metal type automatic choke 41 and solenoid 42 which is adapted to be energized upon engagement of the starter switch contact of the engine.

Connected to throttle link 30 by means of pivotable link 43 is the link 44 having its end portion 45 adapted to ride on fast idle cam 46 on line 47 which is connected to automatic choke 41 by means of lever 48 whereby the position of the fast idle cam is automatically controlled by means of the solenoid 42 and thermostatic type automatic choke 41.

The fuel supply line 16 is connected to the throttle body 12 by means of the line 49 from which fuel passes through duct 50 which is controlled by priming valve 51 to sump 52 from which fuel may pass through duct 53 to the intake manifold 54.

The passage of air through duct 53 to the intake manifold is controlled by the idle mixture adjustment screw 55.

The priming valve 51 is connected to thermostatic choke member 41 by means of link 47 and pivoted lever 56 which has an end engaging starting valve member 57 engaging priming valve 51 and adapted to open said valve against the force of valve spring 58.

In the throttle body 12 are provided the passages 59 above throttle and 60 below throttle and the passages are connected to the cylinder 35 by means of the bleed line 61.

Within cylinder 35 are positioned the coil springs 62 and 63. The manifold pressure piston 34 is shown in full rich position.

Figure 2:
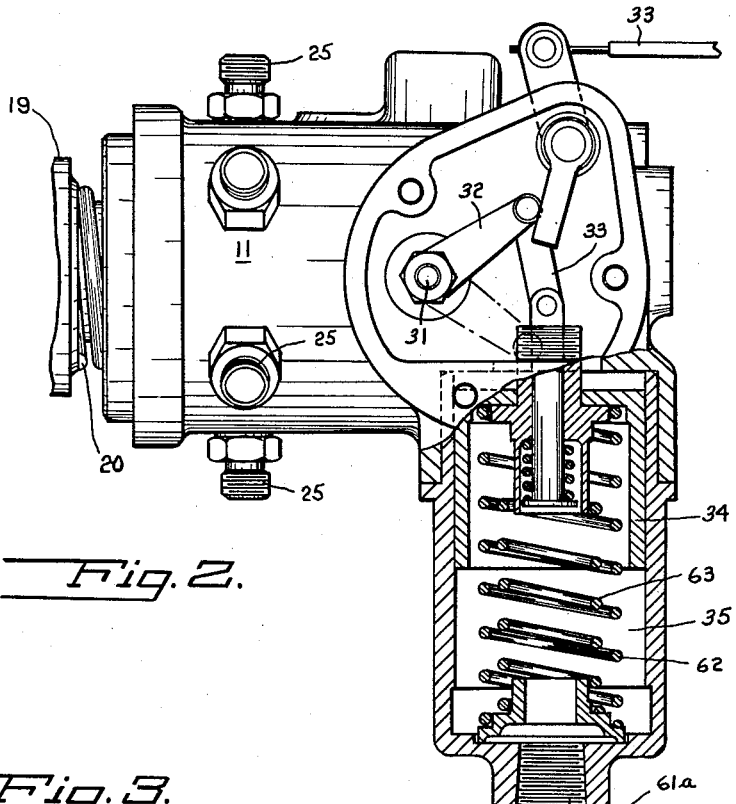
Fig. 2 is a side view, partially in section, of a pump and control unit assembly of the present invention.

In the forms of the invention shown in Figs. 2, 5 and 6, the manifold pressure piston and injection pump are combined into a single unit which can be put on the test stand as a unit for calibration as a unit and then installed on the engine as a unit in calibrated condition.

This allows the calibration of the pump and control on a test stand and then mounted on the engine, where desired, without the necessity of linkage or the like, and furthermore, because of the close proximity of the pump and control, when the vacuum is dropped in the manifold pressure piston when acceleration response is more rapid with less delay and fuel and air reach the engine cylinders substantially simultaneously. This arrangement also simplifies the problem of sealing of the control shaft which is vented to the engine manifold and when leakage of fuel is drawn into the engine manifold.

It will also be seen that this arrangement provides a completely sealed construction whereby dirt and foreign particles are kept out of the working parts of the apparatus.

The operation of the device is as follows:

For starting the engine, the ignition key is turned on and the starter button pushed whereupon, rod 47 lifts, because of solenoid 42 and automatic choke 41, and causes valve 57 to substantially close or restrict port 60 and open port 59 which communicates through port 61 to chamber 35 which allows springs 62 and 63 to be pressed by piston 34 and thereby causing pump lever 32 to be moved to its full rich position. At the same time that this takes place, this sequence of operations, valve member 57 opens needle valve 51 against the force of spring 58 and allows fuel through the supply system, from the line 49, to enter chamber 52 from which it is drawn by the manifold vacuum through port 53 and leaks past valve 57 through duct 60 to the throttle body into manifold 54 thereby further increasing the richness of the mixture entering the cylinders and allowing a rich enough mixture for cold starting.

When the engine has started and the starter button is released, the lever 48 and rod 47 are automatically moved to the intermediate position because the solenoid 42 is no longer energized. In this intermediate position, the valve 51 closes off the passage of fuel into the throttle body through line 49 although valve 57 still closes off port 60.

The mixture, at this time, is sufficiently rich to operate the engine cold, when the engine has been idle, faster to normal idle which is effected by cam 46 acting on rod 44, as previously described, and causes throttle blade 28 to be slightly opened to allow for the increased air flow thereby, the engine is idling at a more rapid rate. During the next few minutes of engine running, the engine will gradually warm up the bi-metalic thermostat in automatic choke 41, being mounted on the exhaust manifold crossover 40, and effect further adjustment of lever 48 and rod 47 from the intermediate position, previously described, to a normal operating position opposite the starting position previously described, which places valve 57 in such position as to close off port 59 and open port 60 which communicates through duct 61 with spring chamber 35, as previously described, which causes the position of the rod 33 and lever 32 to effectively give the proper proportion of air fuel to the proper running of the engine.

The springs 62 and 63 are so calibrated as to position piston 34 and pump control lever 32 according to the manifold pressure in the engine which has been previously determined as the correct air fuel ratio as the engine should operate.

Idle adjustment screw 55 allows the adjustment of the idle speed of the engine by allowing a controlled amount of air from above throttle to enter through duct 53 to chamber 52 and through port 61 to spring chamber 35, when the port 53 communicates with throttle body above the throttle blade or butterfly thus changing the manifold pressure and modifying the vacuum in chamber 35 to a lower value than what is in the throttle body below the throttle blade thereby effectively increasing the setting of the pump giving a slightly richer mixture. This device is only effective during the idle range. When the engine speed increases above a predetermined idle speed, it becomes more effective because the port 53 communicates with the throttle body at a point below the throttle blade and, therefore, said port is no longer effective for modifying the pressure in the vacuum in chamber 35, as previously described.

In the arrangement shown in Fig. 2, the control is shown attached directly to the pump 11 with a line from the throttle body adapted to be connected to coupling 61a on the control and which line replaces duct 61. This arrangement is otherwise similar to that shown in Fig. 1 except for the direct association of the control with the pump, as previously described.

The arrangement shown in Fig. 5 is generally similar to that shown in Fig. 2 except that a modified form of control piston is employed. In this form of control the piston is shown divided into two piston sections, 34a and 34b, with spring 63 actuating piston 34a and spring 62 actuating piston section 34b.

In this arrangement, a separate coupling 61a is provided for each of the pistons and is adapted to be connected by a line to the throttle body in the manner of duct 61 and to replace said duct.

In this form of apparatus, the spring 62 is for acceleration only and spring 63 is for the normal operation of the engine. The additional spring 63a in cup 63b is provided for modifying the fuel curve that would be obtained with spring 63 alone.

This form of apparatus does not have any means for providing excess fuel for starting the engine.

In the form of the invention shown in Figs. 6 and 7, the pistons 34a and 34b are in side by side relation with the rod 33 provided for each of the pistons and connected to common link 33a which in turn is connected through link 33b to pump control lever 32.

The operation of this form of control piston is further illustrated in Figs. 8 and 10 and described in connection with those figures.

Fig. 8 is a series of views illustrating the positions of the pistons of the type shown in Fig. 7 during the various operating conditions of the engine and Fig. 9 is a similar series of views showing the operation of the form of control piston of Fig. 5.

The graph of Fig. 10 illustrates the fuel requirements of a typical automotive type engine and engine speed at various manifold pressures and the numbers 1, 2, 3, 4 and 5 on Fig. 10 correspond with the similarly numbered views of Figs. 8 and 9 and it will be noted that 1 in Fig.

10 shows the fuel quantity during starting and in Figs. 8 and 9 illustrates the positions of the control piston during starting of the engine.

In Figs. 8 and 9 the lines 61a and 61b correspond with the lines described in connection with Fig. 5 and line 61a is a manifold pressure line allowing rapid changes of pressure and is connected to the throttle body above the throttle blade or butterfly during starting of the engine. Line 61b is a manifold pressure line with a restriction, thereby allowing slow changes of pressure and this line is always connected to the throttle body at a position beneath the throttle blade or butterfly.

In illustration 1 of Figs. 8 and 9, the pump control levers 32 have been adjusted to maximum fuel position for starting and acceleration.

In illustration 2 of these figures, the pump control levers 32 have been adjusted to no load fuel position, illustrating the position of the control just after starting of the engine. Illustration 3 of these figures shows the position of this lever at the maximum fuel position for starting and acceleration which is at a point similar to illustration 1 beyond the full load fuel position.

Illustration 4 shows this lever in the full load fuel position and illustration 5 shows this lever in shut off position.

In Fig. 10, the figures indicating engine r.p.m. and figures indicating fuel quantity are merely representative and are not intended to indicate accurate fuel quantities for engine r.p.m. or vice versa.

In Fig. 10, point 1 indicates the excess or beyond full load fuel quantity supplied by the pump for starting the engine, point 2 shows the idle fuel flow after engine has warmed up.

Rapid acceleration will cause the fuel flow to jump immediately to point 3 because of the restriction in line 61a, then fuel quantity will decrease to point 4 back to normal operation. The time or rate of return to normal full load fuel flow will depend on the size of the orifice in line 61a which would allow the pressures in the cylinders to equalize and assume position indicated by point 4.

For slow acceleration and deceleration under load, the fuel quantity increase and decrease will follow the full line between points 2 and 4.

Point 5 indicates the reverse condition obtained on rapid deceleration.

We claim:

1. In a device of the character described, a fuel injection pump having an outlet for delivering fuel to each of the engine cylinders, said pump having quantity control means, an air throttle body, an adjustable member in said throttle body for controlling the passage of air therethrough, means for controlling the position of said adjustable member in said throttle body, means for automatically adjusting the position of said pump control, comprising a cylinder and a piston in said cylinder with said piston being connected to said quantity control, spring means in said cylinder normally tending to move said piston to predetermined position, a duct communicating with said throttle body above said adjustable member and a second duct communicating with said throttle body below said adjustable member, and a passage whereby said ducts may communicate with said cylinder and duct controlling valve means for substantially closing one of said ducts, a line for providing fuel to the engine manifold for starting and a fuel valve for controlling the passage of fuel from said line to the engine, an automatic choke and means connecting said automatic choke to said duct controlling valve.

2. In a device of the character described, a fuel injection pump having an outlet for delivering fuel to each of the engine cylinders, said pump having quantity control means, an air throttle body, an adjustable member in said throttle body for controlling the passage of air therethrough, means for controlling the position of said adjustable member in said throttle body, means for automatically adjusting the position of said pump control, comprising a cylinder and a piston in said cylinder with said piston being connected to said quantity control, spring means in said cylinder normally tending to move said piston to predetermined position, a duct communicating with said throttle body above said adjustable member and a second duct communicating with said throttle body below said adjustable member, and a passage whereby said ducts may communicate with said cylinder and duct controlling valve means for substantially closing one of said ducts, a line for providing fuel to the engine manifold for starting and a fuel valve for controlling the passage of fuel from said line to the engine and means connected to said duct controlling valve means for closing said ducts for controlling the passage of fuel to the engine whereby said fuel valve can be controlled by adjustment of said duct controlling valve, an automatic choke and means connecting said automatic choke to said duct controlling valve.

3. In a device of the character described, a fuel injection pump having quantity control means, an air throttle body, an adjustable member in said throttle body for controlling the passage of air therethrough, means for controlling the position of said adjustable member in said throttle body, means for automatically adjusting the position of said pump control, comprising a cylinder and a piston in said cylinder with said piston being connected to said quantity control, spring means in said cylinder normally tending to move said piston to predetermined position, a duct communicating with said throttle body above said adjustable member and a second duct communicating with said throttle body below said adjustable member, and a passage whereby said ducts may communicate with said cylinder and a supplemental passage communicating with said second duct and with said throttle body at a point below said adjustable means at speeds other than idling speeds and communicating with said throttle body at a point above said adjustable means at idling speeds for controlling the operation of said cylinder at idling speeds to adjust said pump control for effecting idle enrichment.

4. In a device of the character described, a fuel injection pump having quantity control means, an air throttle body, an adjustable member in said throttle body for controlling the passage of air therethrough, means for controlling the position of said adjustable member in said throttle body, means for automatically adjusting the position of said pump control, comprising a cylinder and a piston in said cylinder with said piston being connected to said quantity control, spring means in said cylinder normally tending to move said piston to predetermined position, a duct communicating with said throttle body above said adjustable member and a second duct communicating with said throttle body below said adjustable member, and a passage whereby said ducts may communicate with said cylinder and a supplemental passage communicating with said second duct and with said throttle body at a point below said adjustable means for controlling the passage of air therethrough at idling speeds and adjusting said pump control for effecting idle enrichment and adjustable means for controlling the effective area of said supplemental passage.

5. In a device of the character described, a fuel injection pump having an outlet for delivering fuel to each of the engine cylinders, said pump having quantity control means, an air throttle body, an adjustable member in said throttle body for controlling the passage of air therethrough, means for controlling the position of said adjustable member in said throttle body, means for automatically adjusting the position of said pump control, comprising a cylinder and a piston in said cylinder with said piston being connected to said quantity control, spring means in said cylinder normally tending to move said piston to predetermined position, a duct communicating with said throttle body above said adjustable member and a second duct communicating with said throttle body below said adjustable member, and a passage whereby said ducts may communicate with said cylinder and duct controlling valve means for substantially closing one of said ducts, a line for providing fuel for starting and a fuel valve for controlling the passage of fuel from said line to the engine, an automatic choke and means connecting said automatic choke to said duct controlling valve and cam means connected to said automatic choke means for automatically adjusting the position of the air throttle means for automatically effecting enrichment of the fuel-air mixture during idling.

References Cited in the file of this patent

UNITED STATES PATENTS

| | | |
|---|---|---|
| 2,132,446 | Schweizer | Oct. 11, 1938 |
| 2,195,927 | Hurst et al. | Apr. 2, 1940 |
| 2,391,221 | Beeh | Dec. 18, 1945 |
| 2,437,023 | Gilbert | Mar. 2, 1948 |
| 2,453,329 | Lee | Nov. 9, 1948 |
| 2,495,299 | Tarter | Jan. 24, 1950 |
| 2,562,656 | Blakeslee | July 31, 1951 |
| 2,623,510 | Schweizer | Dec. 30, 1952 |
| 2,696,809 | Muraszew | Dec. 14, 1954 |
| 2,828,728 | Nystrom et al. | Apr. 1, 1958 |

FOREIGN PATENTS

| | | |
|---|---|---|
| 678,213 | Great Britain | Aug. 27, 1952 |
| 697,616 | Great Britain | Sept. 23, 1953 |